3,496,256
REFRACTORY ARTICLE AND METHOD UTILIZING PREPOLYMERIZED FURFURYL ALCOHOL AS A BINDER
Carl W. Boquist, Park Ridge, Ill., assignor to Basic Incorporated, Cleveland, Ohio, a corporation of Ohio
No Drawing. Continuation of application Ser. No. 284,822, June 3, 1963. This application Feb. 14, 1967, Ser. No. 615,918
Int. Cl. B29c 25/00; C04b 35/64, 9/16
U.S. Cl. 264—29    4 Claims

ABSTRACT OF THE DISCLOSURE

A method of forming a refractory body and the body produced by such method in which basic refractory particles are admixed with a binder of prepolymerized furfuryl alcohol or the combination of at least 50% by weight of prepolymerized furfuryl alcohol and powdered pitch. The resulting admixture is formed into a desired shape and subsequently heated.

---

This application is a continuation of Ser. No. 284,822, filed June 3, 1963 and now abandoned.

The present invention relates to the bonding of basic refractory particles into an integral body and, more particularly, to bonding such particles by the pyrolytic decomposition of a binder containing prepolymerized furfuryl alcohol.

Operation of a basic oxygen furnace imposes severe mechanical, thermal, and chemical stresses on the refractory linings. A compromise solution to the refractory problem has been to mold basic oxide aggregates (either burned dolomite or magnesite) with a coal tar pitch binder. This combination has good spall resistance because of the low modulus pitch component, good resistance to basic slags, and high refractoriness.

However, the system has certain undesirable qualities. Amond these are the difficulties experienced in "burning-in" a lining because of the thermosoftening characteristic of the pitch bond, and the lack of oxidation resistance after the lining is fired or coked. In an oxygen-rich furnace environment, the residual carbon bond at the hot-face may be burned away, leaving an essentially unbonded basic oxide hot-face. As to thermosoftening, the pitch becomes increasingly fluid as the temperature is increased to about 850° F. where a boil, followed by rapid polymerization and coking, occurs. Because of this, behind the coked-out hot face there exists a low strength "mushy" zone that undoubtedly contributes to lining failures from mechanical causes. Another drawback to the pitch binder is that the coking residue is directly related to the softening point. For example, a pitch with a convenient softening point (90°–100° C.) will typically have a coking residue of 40–50 percent. Higher residues can be achieved by use of higher softening-point pitches, but mixing and molding operations become progressively more difficult as the temperature is increased.

Although furfuryl alcohol has been suggested for use in other fields, such use has not heretofore included binding basic refractory articles. Furfuryl alcohol polymerizes (condenses) with an internal generation of water and other non-condensables such as formaldehyde, difuryl methane, and levulinic acid. This condensation is highly undesirable for use with basic refractories, such as magnesia, because of their natural tendency to hydrate. Such hydration results in swelling and ultimate fracture and rupture.

In accordance with the present invention, the pitch normally used to bind basic refractory particles as above described is replaced, wholly or partially, with prepolymerized furfuryl alcohol which yields a higher coking residue and has the additional advantage of being anenable to mixing and molding at room temperature. A further advantage, quite important in the case of hydration prone basic refractories, is that in the prepolymerized or resinified form the furfuryl alcohol polymer has a materially reduced capacity to form water during a further polymerizing condensing reaction.

It is therefore a principal object to provide an improved bonded basic refractory.

Another object is to provide a method of bonding basic refractory particles with prepolymerized furfuryl alcohol and the product resulting thereby.

A further object is to provide a bonded refractory of a basic aggregate, such as magnesia particles, wherein the use of resinified furfuryl alcohol as the binder minimizes the formation of water as a result of the bonding action and therefore minimizes as well the hydration of the magnesia.

A still further object is to provide a method of bonding basic refractory particles with a binder composed of prepolymerized furfuryl alcohol and pitch.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

In carrying out the present invention, a binder of prepolymerized furfuryl alcohol, alone or in admixture with pitch, is blended with basic refractory particles. The admixture is then applied to a point of use which may include forming the admixture in a desired shape. Upon initial heating, for example below about 200° C., there is a further thermosetting of the furfuryl alcohol resin by a continuation of the condensation reaction. Finally, the admixture is heated to a temperature sufficient pyrolytically to decompose the thermoset resin binder and leave a carbon bond.

By "prepolymerized" or "resinified" furfuryl alcohol is meant that furfuryl alcohol, starting for example with the monomeric form, is polymerized prior to admixture with the refractory particles or with the pitch if the latter is used. In this manner, very substantial amounts of water, which splits off when the alcohol condenses, are effectively removed and therefore do not interfere with the use of the polymer as a binder for basic refractory particles such as a magnesia aggregate.

Upon polymerizing, furfuryl alcohol releases water and may eventually reach a polymeric form containing a number of furan groups, for example, eight to eleven groups. During this polymeric growth, the material changes from a thin liquid to an increasingly viscous one. On further heating, usually in the presence of a suitable catalyst such as an acid catalyst, the furfuryl polymer thermosets to a strong mass. Upon still further heating, the thermoset resin decomposes to form a strong carbon residue or "coke," characteristic of coking pitch. It is this carbon residue or coke, which forms a strong bond among the particulate aggregate. It will, therefore, be appreciated that prepolymerization, by decreasing the hydroxyl groups, also reduces the quantity of gas (largely water) which is formed in condensing and polymerizing the monomeric alcohol.

There are several methods of condensing the furfuryl alcohol into a polymeric form for use as herein contemplated. One satisfactory method is disclosed in U.S. Patent 2,681,896, which is hereby incorporated by reference.

In general, the point at which all or most all of the monomer is resinified corresponds to a water collection or removal of about 13 percent by weight of the original charge. This yields a material having a viscosity of at least two hundred centipoises. Resinification can be continued until about 16 percent by weight of water has been removed. The additional condensation beyond a 13 percent water removal results in increasingly higher viscosities. In one resin found very satisfactory, a water removal of 14 percent had been effected, and the resulting polymer had a viscosity of thirty-two hundred centipoises. Prepolymerized furfuryl alcohol when used as a binder as herein disclosed has had a thermoset yield of more than 99 percent at 125° C. and a coking yield of 60 percent.

It has been found that the conventional pitch binders are at least partially soluble in the present furfuryl alcohol polymers. Amounts up to about 50 percent pitch by weight have been incorporated in the furfuryl polymer without destroying the thermosetting properties of the composite binder. There is no critical lower limit for the amount of pitch which may be used, and amounts as small as 0.01 percent by weight may be used. Although the pitch was initially used primarily as an extender, it has surprisingly been found, as hereinafter more fully described, that certain mixed polymer-pitch binderas have properties superior to either the polymer or pitch, when used by itself as a binder. In particular, improved strengths and lower coking losses are experienced with certain ranges of polymer and pitch combinations.

The pitches which may be used are known in the art and, for instance, generally comprise those derived from coal tar and have a melting point of 60° C. to 160° C. as measured by the ASTM Method of Test D36–26. In some instances, coal tar itself is used for bonding the refractory particles, coal tar pitch being free of the lower boiling constituents ordinarily found in coal tar. Some of the bituminous asphalts may also be used provided they have the property of decomposing pyrolytically to form a carbon residue.

The refractory particles herein contemplated include the non-combustible materials such as metal oxides. These, in turn, may include alumina, zirconia, magnesia, zircon, chrome ore, chromium oxide, dead-burned dolomite, and stabilized dolomote. Magnesia is preferred. Depending on the applications intended, dead-burned dolomite can be used, although if hydration is a particularly important problem it is recommended to use pitch with the prepolymerized furfuryl alcohol. Mixtures of the various materials indicated may, of course, also be used.

The sizes of the particles are not at all critical and may comprise any of those commonly used in the art. As an example, particle sizes may vary from pieces as large as one-half inch in cross-section down to finely ground particles passing through a two hundred mesh U.S. Standard sieve. Ordinarily, particles of different sizes are jointly used as is known in the art. The size gradation is selected to give, upon compaction, as dense a mass as possible with a minumum of voids. In fabricating an article in accordance with the present invention, the particles and binder are merely intermixed. For economical reasons, no more binder need be used than that which effectively binds the particles one to another. Usually the binder comprises about 4 percent to about 8 percent by weight of the admixture whether pitch is included or not. If pitch is used, it is mixed at a temperature below its softening point with particles of the basic refractory grains and the resin binder. Excessive heat should be avoided to prevent premature polymerization of the resin.

After the refractory particles and binder are blended as described, the resulting admixture may be used as such as a ramming mix or shot from a gun as practiced in the art to deposit the admixture at a point of use. Alternatively, the admixture may be used as a mortar to bond brick together or the admixture may be shaped as by pressure into a desired form, such as a brick. The admixture may first be heated at a relatively low temperature, for example from about 200° F. to about 400° F., further to polymerize or thermoset the furfuryl resin polymer. In any case, the admixture is ultimately heated to a temperature sufficient pyrolytically to decompose the binder and form a carbon bond. In general a temperature of 1500° F. or higher suffices to carry out the pyrolytic decomposition.

The prepolymerized furfuryl alcohol performs well under the circumstances indicated. At this stage of its use, only about two to three percent water is present with the furfuryl polymer, and this is not enough to seriously affect refractories like magnesia. Also, the prepolymerized furfuryl alcohol itself does not react with the refractory particles, as would other thermosetting resins, such as phenol formaldehyde. Further, because the described admixture is coked in place, the thermosetting binder mixture performs in a superior manner to thermosoftening binders such as pitch.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

Examples 1 to 5

An all-magnesia aggregate was formulated consisting of 60 parts by weight of magnesia, −5 +20 mesh, 40 parts of −48 mesh periclase fines, and 6 parts of binder. The binder level was kept constant, but was varied in composition as shown below, the parts being by weight:

| | Pitch 80° C. S.P. (parts) | Pitch 145° C. S.P. (parts) | Resin 3,200 cps. (parts) |
|---|---|---|---|
| Aggregate (parts): | | | |
| 100 | 0 | | 6 |
| 100 | 1 | | 5 |
| 100 | 2 | | 4 |
| 100 | 3 | | 3 |
| 100 | | 6 | |

"S.P." represents "softening point." The higher softening point pitch was used with the resin to increase the coking residue. The lower softening point pitch was used to prepare control samples. In those samples containing resin, the aggregate portion was dry-mixed with the powdered pitch for five minutes at room temperature in a paddle mixer. Methyl p-toluene sulfonate catalyst (2 weight percent of the resin fraction) was stirred into the resin and then added to the premixed dry ingredients. After approximately 10 minutes mixing, it appeared as though the resin had "wet" the aggregate and partially dissolved the pitch. However, mixing was continued for an additional 5 minutes to insure a uniform distribution.

In the case of the control samples, granular or powdered ingredients were dry mixed for 5 minutes in a blender and then gradually heated until the mix temperature reached 100° C. It will be noted that the pitch was not melted at this stage. The mixture was then cooled with the mixer still in operation until room temperature was reached.

The resin-containing mixes were pressed at room temperature into bars 1⅛ inches by 4⅜ inches by 1 inch high at 12,000 p.s.i. for one minute. Nine bars were prepared from each composition. The pitch-bonded control samples also were pressed at 12,000 p.s.i., but the cold mix was preheated for 15 minutes in the die, which was maintained at 125° C., prior to pressing for 1 minute. When the temperature was raised to 180° C. for 24 hours, all of the resin-containing specimens cured satisfactorily.

In the coking procedure, bars were imbedded in a petroleum-coke, carbon-black mixture contained in stainless steel boxes with loosely fitting covers. The boxes in turn were placed in a larger sealed stainless container which was continuously purged with nitrogen throughout the heating and cooling cycle. The furnace was programmed to rise from room temperature to 1000° C. at a linear rate over a period of 24 hours. The samples were held at maximum temperature for 2 hours and cooled to room temperature overnight.

All samples were weighed to the nearest 0.1 g. and measured to the nearest 0.001 inch. Green thermoset pieces were tested for strength in flexure with center point loading on a 4 inch span. After coking, samples were reweighed, measured, and broken in flexure.

Table A shows the average physical property data obtained on the all-magnesia system. In the green thermoset stage all combinations of resin mixtures are both stronger and denser than the pitch-bonded controls, except for the lower density of the 3:3 pitch-resin series. This is attributed to insufficient liquid present to provide the lubrication needed for maximum compaction. After coking, the strengths of the resin-pitched bonded samples show a dramatic increase.

Why the addition of only a small amount of pitch to the polymer should so sharply increase the coke residue is not known. As is evident from Table A, the coking residue of the resin-pitch mixtures reaches a maximum at approximately a resin-pitch ratio of 3:3 to 4:2. Shrinkage values did not exceed 0.1 percent measured over the sample length of 4⅜ inches.

Samples of the all-magnesia system, green and coked, were observed for hydration resistance. No deterioration was noted for the samples over a 6-month period.

Examples 6 to 10

This series of samples was molded and tested in a manner similar to the all magnesia compositions. The grain consisted in parts by weight of 60 parts of deadburned dolomite, −6 +12 mesh; 40 parts low flux dolomite fines, −48 mesh; and 6 parts binder. No difficulty was experienced in molding or thermosetting, and no tendency toward cracking was noted.

Table B shows the results of the all-dolomite composition. The most striking feature is the high flexural strengths in the thermoset condition, although the coked strengths are probably somewhat adversely affected by hydration during coking operation.

Also of note in Table B are the negative coking residue for the pitch-bonded control samples and the low residues for the resin-pitch samples. This occurred because of corner and edge deterioration and the resultant loss of some of the aggregate in handling. It does, nevertheless, show the trend for higher coking values and strengths for the mixed resin-pitched binder.

In general, it has been found that the resin to pitch ration of 3:3 to 5:1 provide improved flexural strengths after coking as compared to either the resin or pitch alone. Also, substitution of pitch for part of the resin markedly lowers its oxidation rate.

It is within the contemplation of the invention to prepare a bonded basic refractory in which the grains or particles are mixed as described with the prepolymerized furfuryl alcohol and then bonded one to another into a desired shape by further polymerization of the furfuryl polymer but short of pyrolytic decomposition of such polymer. Indeed, a bonded refractory of this type readily forms a marketable product which can be shipped and then installed at a point of use, such as in a furnace lining. The polymeric decomposition of the furfuryl polymeric to a carbon bond then takes place upon heating of the furnace.

TABLE A.—COMPARATIVE PHYSICAL AND CHEMICAL PROPERTIES OF BARS MOLDED WITH 60 PARTS −5 +20 MESH MAGNESIA 40 PARTS OF −48 MESH PERICLASE FINES, AND 6 PARTS BINDER

| | Green-Thermoset | | | | Coked to 1000° C. | | | |
|---|---|---|---|---|---|---|---|---|
| | Binder | | | | | | | Panel |
| | Pitch | Resin | Density | Flexural Strength | Coking Loss | Coking Residue | Flexural Strength | Oxidation Loss |
| Examples | (parts) | (parts) | (lbs./ft.³) | (p.s.i.) | (weight percent) | (weight percent) | (p.s.i.) | (weight percent) |
| 1 | *6 | 0 | 174.7 | 1,752 | 3.55 | 37.3 | 1,783 | 3.50 |
| 2 | †3 | 3 | 172.9 | 1,918 | 1.98 | 65.0 | 3,268 | 3.38 |
| 3 | †2 | 4 | 176.6 | 2,726 | 2.00 | 64.7 | 3,673 | 3.37 |
| 4 | †1 | 5 | 179.1 | 2,265 | 2.22 | 60.8 | 3,983 | 3.51 |
| 5 | 0 | 6 | 179.0 | 2,442 | 2.84 | 49.8 | 3,808 | 3.70 |

*80° S.P. Pitch.   †145° S.P. Pitch.

TABLE B.—COMPARATIVE PHYSICAL AND CHEMICAL PROPERTIES OF BARS MOLDED WITH 60 PARTS −6 +12 MESH DEAD-BURNED DOLOMITE, 40 PARTS −48 MESH DEAD-BURNED DOLOMITE FINES, AND 6 PARTS BINDER

| | Green-Thermoset | | | | Coked to 1000° C. | | |
|---|---|---|---|---|---|---|---|
| | Binder | | | | | | |
| | Pitch | Resin | Density | Flexural Strength | Coking Loss | Coking residue | Flexural Strength |
| Examples | (parts) | (parts) | (lbs./ft.³) | (p.s.i.) | (weight percent) | (weight percent) | (p.s.i.) |
| 6 | *6 | 0 | 169.9 | 1,489 | 6.32 | −11.8 | 149 |
| 7 | †3 | 3 | 163.7 | 1,751 | 4.08 | 28.0 | 437 |
| 8 | †2 | 4 | 167.3 | 2,222 | 4.07 | 28.1 | 487 |
| 9 | †1 | 5 | 171.1 | 2,517 | 4.22 | 25.5 | 251 |
| 10 | 0 | 6 | 171.2 | 2,786 | 4.67 | 17.5 | 335 |

*80° S.P. Pitch.   †145° S.P. Pitch.

EXAMPLE 11

The specimens and data of this example are all designed to illustrate use of the present invention as a ramming mix. The following discussions of the ramming mix components are supported by Table C.

A hydration resistant grade of periclase, in excess of 98 percent MgO, was used as the refractory material. Because of the small size of the laboratory samples (2 inch diameter by 2½ inches high), the top grain size was limited to 5 mesh with the other fractions following a good packing density curve of the "gap sized" type. This size restriction would not be necessary for a commercial product as long as good packing density is obtained. The refractory fraction comprised from 89 to 96 percent by weight of the total batch.

The basic binder in the ramming mix is prepolymerized furfuryl alcohol resin. To this basic binder, a number of materials can be added to alter the properties of the mixes as needed. Prepolymerized furfuryl alcohol resin in a viscosity range of from 200–500 cps. was used because of easier laboratory handling and mixing. This restriction need not be placed on a commercial application; a resin of 1000–10,000 cps. could easily be used. The resin, which should comprise 4–5 percent of the total batch, may or may not be premixed with the other additives.

Methyl para-toluene-sulfonate was used as a latent catalyst with good results. This material normally comes with a small amount of free acid which reduces shelf life by only a small degree as compared to specially prepared acid-free catalysts. Depending upon the shelf life desired, a number of agents are available ranging from strong inorganic acids to acid-producing salts. The catalyst level used in the laboratory work was 2 percent of the resin fraction. This amount may be reduced if a longer thermosetting period is desired or increased if a shorter period is desired. The strong acids would be used for short shelf life applications in low concentrations such as 1 percent or less of the resin. Inorganic salts such as $ZnCl_2$ could be used in concentrations as high as 5 percent of the resin fraction with no ill effects.

It has been found advantageous to add powdered, high softening point coal tar pitch to the basic resin binder in ratios as high as one to one. The powdered pitch partially dissolves in the resin and aids in workability without destroying the binder's thermosetting characteristics. Furthermore, the resin-pitch mixture yields a higher coke residue when pyrolyzed than either the pitch or the resin by itself. Total pitch content may range from 4–5 percent of the batch.

To improve green strength and workability, additions of diluents such as creosote, furfural, and monomeric furfuryl alcohol were also found to be advantageous. Creosote and furfural are both pitch and resin solvents while the monomer is a resin solvent. An addition of 1 percent creosote increases thermoset strength by 700 p.s.i. Although the strength continues to increase, the rate of increase drops off with further additions. For example an increase of from 1 to 2 percent is accompanied by a strength improvement of only 250 p.s.i. Furfural, on the other hand, causes less improvement than does creosote at the 1 percent level, but this improvement continues steadily until at the 2.5 percent level a thermoset strength of nearly 9000 p.s.i. is achieved. The creosote has a cost advantage while the furfural has an advantage in coke residue and strength at higher concentrations. For applications where a wetter mix is desired, the low viscosity monomer may be added in small quantities. The total diluent content necessarily will be governed by the application, but generally is not greater than 2.5 percent of the final batch.

Example 12

The specimens and data of this example are all designed to illustrate the use of the present invention as a mortar mix. The mortar mix deviates somewhat from normal refractory practice because of the workability requirements. Because pitch-resin mixtures do not have as good trowelability as clay-water mixtures, additives were used which improved workability at the expense of strength. Separation of the liquid fraction and segregation of the aggregate materials were also overcome by the use of additives. In applications where trowelability, settling, and segregation are relatively unimportant, both thermoset and coked strengths can generally be increased by reducing or eliminating the additives. The following discussions are substantiated by data in Table D.

Hydration resistant periclase (98+ percent MgO) was used as follows:

| | Percent |
|---|---|
| −40 +100 mesh | 13–35 |
| −100 +200 mesh | 10–19 |
| −200 +325 mesh | 10–19 |
| −325 mesh | 67–37 |

These percentage ranges may be varied considerably, but generally the finer mixes have a greater degree of trowelability than the coarser ones. Periclase is considered to constitute 100 percent of the aggregate with everything else considered as the binder. The aggregate fraction constituted from 70–80 percent of the total mortar.

The base material for the binder fraction of the mortar mix is also prepolymerized furfuryl alcohol resin. To this basic binder, a number of materials can be added to alter the properties of the mix for specific applications. Prepolymerized furfuryl alcohol resin in the viscosity range from 200–500 cps. was used because of easier handling and mixing and lower liquid demand. The resin has been tested from 30.7 to 100 percent of the binder fraction. All of these mixes seem to have merit for one purpose or another. The catalysts used were the same as those used in the ramming mix, and conditions for use were the same.

Because of the large quantities of binder required as compared to the ramming mix, resin-pitch ratios were increased to provide more liquid per unit of binder. Other than this ratio change, pitch was used in the same manner as in the ramming mix. The pitch may constitute from 0 to 26 percent of the binder. To improve trowelability and to prevent separation and segregation, it was found advantageous to add a carbon black with a particle size of from 20–40 millimicrons. Mixes containing carbon blacks in concentrations as low as 2.0–3.5 percent of the total batch exhibited excellent workability and had no tendency to separate and segregate. However, there was a reduction in both thermoset and coked strengths with increased additions of black. Thermal blacks of the general size 300–500 millimicrons reduced segregation to a lesser degree when added in the range of 1.0–3.0 percent of the total batch but did not lower the strength as much as did the small sized blacks. An intermediate particle sizes should retain some of the advantages of both.

To provide the liquid required for a trowelable mortar mix, diluents such as furfural, monomeric furfuryl alcohol and toluene may be added. To modify the viscosity and flow properties of the resin-pitch fraction, any one or combination of the three can be used. The ratios of the solvents to one another vary such properties as wettability, strength, coke residue, and trowelability. Furfural and toluene are both pitch and resin solvents and as such can increase strength and trowelability. Furfuryl alcohol is only a resin solvent and contributes primarily to the ability of the binder to wet the filler grains and lower the resin content. Furfural and monomeric furfuryl alcohol have some coke residue while toluene has none.

The total diluent requirements depends upon the carbon black addition and on the troweling properties desired, but ordinarily the amount of diluent does not exceed 10 to 12 percent of the total batch.

TABLE C.—COMPOSITIONS AND PHYSICAL PROPERTY DATA FOR RAMMING MIXES

| Periclase Fractions (parts) | | | | Binder Fraction (parts) | | | Thermoset Density (lb./ft.³) | Thermoset Strength (p.s.i.) | Coked Strength (p.s.i.) |
|---|---|---|---|---|---|---|---|---|---|
| −5 +20 | −20 | −48 | .75%−200 | 145° C. pitch | Resin | Diluent | | | |
| 55 | | 45 | | 2 | 4 | | 152.5 | 2,229 | 1,352 |
| 55 | | | 45 | 2 | 4 | | 152.0 | 1,804 | 1,483 |
| 55 | | 45 | | 4 | 4 | | 150.1 | 4,394 | 1,995 |
| 55 | | | 45 | 3 | 5 | | 152.8 | 4,639 | 1,549 |
| 55 | | 45 | | 3 | 5 | | 152.7 | 3,861 | 1,868 |
| 35 | 35 | | 30 | 3 | 5 | | 151.6 | 4,617 | ND |
| 35 | 35 | | 30 | 3 | 5 | *1 | 150.4 | 5,318 | ND |
| 35 | 35 | | 30 | 3 | 5 | *1.5 | 150.4 | 5,414 | ND |
| 35 | 35 | | 30 | 3 | 5 | *2 | 150.1 | 5,573 | ND |
| 35 | 35 | | 30 | 3 | 5 | *2 (aged) | 153.7 | 6,210 | ND |
| 35 | 35 | | 30 | 3 | 5 | **1 | 152.6 | 4,904 | ND |
| 35 | 35 | | 30 | 3 | 5 | **1.5 | 152.3 | 6,082 | ND |
| 35 | 35 | | 30 | 3 | 5 | **2 | 154.6 | 7,452 | ND |
| 35 | 35 | | 30 | 3 | 5 | **2.5 | 159.1 | 8,917 | ND |
| 50 | 10 | 40 | | 3 | 5 | **1 | 152.5 | 3,439 | ND |
| 50 | 10 | 40 | | 3 | 5 | **2 | 157.0 | 7,675 | 3,737 |
| 35 | 35 | | 30 | 3 | 5 | **2 | 153.9 | 5,785 | 3,386 |

*Creosote.  **Furfural.

TABLE D.—COMPOSITIONS AND PHYSICAL PROPERTY DATA FOR MORTAR MIXES

| Periclase Filler (parts) | | Binders and Modifiers | | | | | | Working Properties | | | | Flexural strength [d] | |
|---|---|---|---|---|---|---|---|---|---|---|---|---|---|
| −48 mesh | −325 mesh | Resin | Pitch | Furfuryl Alcohol | Furfural | Carbon | Diluents | Particle segregation | Liquid separation | Trowelability | Drag | Thermoset Strength | Coked Strength |
| 44.7 | 55.3 | 9.2 | | 2.1 | 6.3 | [a] 4.0 | [c] 1.3 | H | H | M | H | 1,140 | ND |
| 44.8 | 55.2 | 9.6 | 3.9 | 2.2 | 6.5 | [a] 1.2 | | M | M | M | M | 930 | ND |
| 63.1 | 36.9 | 8.7 | 2.6 | 2.0 | 5.9 | [a] 2.3 | | L | M | M | M | ND | ND |
| 63.1 | 36.9 | 9.5 | 6.1 | 2.2 | 6.4 | [a] 2.3 | | L | M | M | M | ND | ND |
| 63.1 | 36.9 | 9.6 | 2.6 | 2.1 | 6.3 | [a] 4.6 | | L | M | L | H | ND | ND |
| 63.1 | 36.9 | 8.7 | 7.3 | 2.0 | 5.9 | [a] 2.3 | [c] 1.9 | M | H | L | H | ND | ND |
| 36.9 | 63.1 | 10.8 | 2.6 | 2.5 | 7.3 | [a] 2.3 | | L | M | H | M | ND | ND |
| 36.9 | 63.1 | 11.1 | 6.3 | 2.5 | 7.5 | [a] 2.3 | | M | M | M | H | 1,005 | ND |
| 36.9 | 63.1 | 10.8 | 2.5 | 2.5 | 7.3 | [a] 4.8 | | L | L | H | M | 870 | ND |
| 33.3 | 66.7 | 11.2 | 4.3 | 2.6 | 7.6 | [b] 3.7 | [c] 2.1 | VL | VL | VH | VL | 1,330 | ND |
| 37 | 63 | 22.1 | | | | | | H | M | L | H | 1,035 | 705 |
| 37 | 63 | 23.2 | 3.0 | | | | | L | L | H | L | 1,075 | 755 |
| 37 | 63 | 14.6 | 3.0 | | 9.2 | | | M | M | M | M | 1,040 | 790 |
| 37 | 63 | 11.6 | 3.0 | 2.6 | 7.3 | | | ND | ND | ND | ND | 1,090 | ND |
| 37 | 63 | 13.5 | 3.0 | 3.0 | 8.5 | [b] 3.0 | | VL | VL | VH | VL | 715 | 360 |
| 37 | 63 | 25.0 | | | | [b] 3.0 | | VL | VL | H | VL | 1,000 | 360 |
| 37 | 63 | 12.5 | 3.0 | 7.9 | 2.8 | | | VL | VL | H | L | 950 | 640 |

[a] Thermax Carbon Blacks.  [b] Cabot Elf "G" Carbon Blacks.  [c] Toluene.  [d] ASTM Mortar Joint Test C198-47.
VL=very low; L=low; M=medium; H=high; VH=very high; ND=not determined.

Other modes of applying the principle of the invention may be employed, change being made as regards the details described, provided the features stated in any of the following claims, or the equivalent of such, be employed.

I therefore particularly point out and distinctly claim as my invention:

1. A method of forming a refractory body comprising the steps of admixing refractory particles of up to ½ inch in cross-section selected from the group consisting of alumina, zirconia, magnesia, zircon, chrome ore, chromium oxide, dead-burned dolomite, and stabilized dolomite with from about 4 to about 8% by weight of a binder to bind said particles into an integral mass, said binder selected from the group consisting of prepolymerized furfuryl alcohol and the combination of at least 50% by weight of prepolymerized furfuryl alcohol and powdered pitch, said prepolymerized furfuryl alcohol being formed by polymerizing monomeric furfuryl alcohol by condensation until about 13 to about 16% by weight of water has been removed and the polymer has a viscosity of about 200 to about 10,000 centipoises, said binder containing up to about 5% by weight, based on the weight of the prepolymerized furfuryl alcohol present, of a catalyst to accelerate further polymerization of the binder, forming such admixture into a desired shape, and subsequently heating such shape in a non-oxidizing atmosphere to a temperature of at least about 1500° F. to decompose said binder and form a carbon bonded refractory product.

2. A refractory mix consisting essentially of an aggregate of refractory particles of up to one-half inch in cross-section selected from the group consisting of alumina, zirconia, magnesia, zircon, chrome ore, chromium oxide, dead-burned dolomite and stabilized dolomite and from about 4 to about 8% by weight of a binder to bind said refractory particles together, said binder consisting of the combination of at least 50% by weight of prepolymerized furfuryl alcohol and powdered pitch, said prepolymerized furfuryl alcohol being formed by polymerizing monomeric furfuryl alcohol by condensation until about 13 to about 16% by weight of water has been removed and said polymer has a viscosity of from about 200 to about 10,000 centipoises.

3. The refractory mix of claim 2 in which said binder includes up to about 5% by weight, based on the weight of the prepolymerized furfuryl alcohol, of a catalyst to accelerate further polymerization of said binder.

4. A bonded refractory article consisting essentially of an aggregate of refractory particles of up to one-half inch in cross-section selected from the group consisting of alumina, zirconia, magnesia, zircon, chrome ore, chromium oxide, dead-burned dolomite, and stabilized dolomite bonded together into an integral shape by from about 4 to about 8% by weight of a thermoset organic binder consisting essentially of the combination of at least about 50% by weight of prepolymerized furfuryl alcohol and powdered pitch, said prepolymerized furfuryl alcohol having been formed by polymerizing monomeric furfuryl alcohol by condensation until about 13 to about 16% by weight of water has been removed and said polymer has a viscosity of from about 200 to about 10,000 centipoises, said binder being capable of undergoing pyrolytic decomposition to form a carbon bond among said refractory particles.

(References on following page)

References Cited

UNITED STATES PATENTS

| | | | |
|---|---|---|---|
| 2,681,896 | 6/1954 | Nielsen | 260—41 |
| 2,884,391 | 4/1959 | Winter et al. | 260—28.5 |
| 3,015,850 | 1/1962 | Rusoff et al. | 264—29 |
| 3,030,228 | 4/1962 | Hernandez et al. | 106—58 |
| 3,044,889 | 7/1962 | Ekedahl et al. | 106—58 |
| 3,070,449 | 12/1962 | Davies et al. | 264—30 |
| 3,198,714 | 8/1965 | Johnson et al. | 106—56 |
| 3,201,330 | 8/1965 | Price | 264—29 |
| 3,210,205 | 10/1965 | Shurtz | 106—58 |

OTHER REFERENCES

A. E. Dodd, Dictionary of Ceramics, 1964, pp. 227 and 48.

JULIUS FROME, Primary Examiner

JOHN H. MILLER, Assistant Examiner

U.S. Cl. X.R.

106—56, 58; 260—41, 28.5; 264—30, 63